United States Patent [19]
Warne

[11] Patent Number: 5,704,275
[45] Date of Patent: Jan. 6, 1998

[54] ELECTRONIC BREW CONTROL SYSTEM

[75] Inventor: Thomas I. Warne, Oakville, Canada

[73] Assignee: Bloomfield Industries Canada, Limited, Mississauga, Canada

[21] Appl. No.: 777,584

[22] Filed: Dec. 31, 1996

[51] Int. Cl.$^6$ ............... A47J 31/00; A47J 31/10; A47J 31/34; A47J 31/42

[52] U.S. Cl. ............... 99/281; 99/285; 99/293; 99/291; 99/485

[58] Field of Search ............ 99/485, 468, 330, 99/279–285, 291, 293, 294, 299, 300, 307, 316, 516, 534; 219/497, 490–492, 505, 42, 501, 494; 392/323, 324, 441, 480, 481, 467; 426/231, 433

[56] References Cited

U.S. PATENT DOCUMENTS

| | | | |
|---|---|---|---|
| 4,468,406 | 8/1984 | D'Arc | 426/231 |
| 5,014,611 | 5/1991 | Illy et al. | 99/280 |
| 5,207,148 | 5/1993 | Anderson et al. | 99/281 |
| 5,230,278 | 7/1993 | Bunn et al. | 99/307 X |
| 5,241,898 | 9/1993 | Newnan | 99/285 X |
| 5,255,593 | 10/1993 | Bunn et al. | 99/280 |
| 5,303,639 | 4/1994 | Bunn et al. | 99/289 R |
| 5,372,061 | 12/1994 | Albert et al. | 99/281 |
| 5,375,508 | 12/1994 | Knepler et al. | 99/280 |
| 5,402,705 | 4/1995 | Bailleux et al. | 99/281 |
| 5,408,917 | 4/1995 | Lussi | 99/323.1 |
| 5,455,887 | 10/1995 | Dam | 219/492 X |
| 5,549,035 | 8/1996 | Wing-Chung | 99/281 |

*Primary Examiner*—Timothy F. Simone
*Attorney, Agent, or Firm*—Myers & Associates, Ltd.

[57] ABSTRACT

A control system for a coffee brewer having a microprocessor in which the water heated in the heater tank must be a predetermined temperature before brewing. A double brewing cycle is prevented. Upon the system not being activated for a period of time, i.e., the water temperature is allowed to drop a greater magnitude for energy saving and component protection.

15 Claims, 4 Drawing Sheets

5,704,275

ELECTRONIC BREW CONTROL SYSTEM

BACKGROUND OF THE INVENTION

This invention relates in general to a beverage brewing apparatus and more particularly to a electronic brew control system for automatic coffee makers.

SUMMARY OF THE PRIOR ART

Automatic coffee brewers have long been in service at offices, restaurants and the like. Automatic coffee brewers allow coffee to be quickly brewed with highly desirable flavor. In use of known coffee brewers, several problems are present. Brewers with electromechanical thermostats generally allow a 10° F. drop in water temperature before reheating. When coffee is brewed at the higher temperature, it will extract more flavor from the coffee grounds, while coffee brewed at the lower temperature will be weaker as it will not extract the maximum mount of flavor. In known brewers, the temperature of the final coffee product can differ by as much as 10° F. depending at what temperature the brew took place. This means that the shelf life of the coffee brewed at the lower temperature could be two or three hours less than if brewed at the higher (correct) temperature. Known coffee brewers have not satisfactorily solved the problem of temperature differential of the water during service.

In addition, most current brewers will allow a "double brew." This condition arises if the brew button is pushed a second time after the first brew has been partially completed. As a result the coffee pot is overfilled and, occasionally, internal overfilling of the coffee brewer apparatus itself occurs. Coffee brewers are also exposed to severe operating conditions and extended service times reducing the component lifetime of the parts and wasting energy if the brewer is not being used during a particular period. Coffee brewers often are plugged in and left running twenty-four hours a day, three hundred and sixty five days a year during this period. The majority of known brewers reheat the water every time the temperature has dropped 10° F. In reheating the water to maintain the 10° F. differential, the brewer is often heating water when there is no demand for coffee, and therefore wasting energy as well as causing extensive wear on components. Accordingly, it is desirable in the prior art to provide an electronic brew control system in which the differential in water temperature in the heating tank is reduced during operation, the possibility of double brewing is eliminated, and an extended component life is attained with reduced energy consumption.

SUMMARY OF THE INVENTION

It is therefore an objective of this invention to provide an improved electronically controlled coffee brewer in which a microprocessor selectively controls operation to overcome the foregoing problems associated with prior art coffee brewers. The coffee brewer of this invention includes means to better regulate the temperature of the water in a manner that the coffee product is not undesirably brewed by water at a lower temperature. In the invention the water temperature is allowed to drop 10° F. before automatically being reheated. However, whenever the brew button is pushed, the invention senses the water temperature in the tank to determine whether it is at or above the set temperature. If it is, the brew proceeds immediately. On the other hand, if the water is not at the appropriate temperature, the water is heated to the precise temperature before allowing the product to proceed. By such a technique, consistent coffee quality and temperature is maintained.

The invention also eliminates the problem of double brewing as in the prior art. The coffee brewer herein disclosed includes a timer which is set at the length of time that the coffee will actually brew as opposed to the length of time that the solenoid valve is open as in the prior art. While the counter is counting down, a second brew is impossible during the countdown of the timer. Upon the timer sensing its preselected time interval, another brew can be registered in the system subject to the correct temperature being established for the water.

The coffee system of the invention further improves component life with energy savings by incorporating a reduced operating mode during idle conditions of the brewer. For example, if the brew button is not pushed at least every three hours or at another selected interval, the water is only reheated for approximately a 25° to 30° F. drop of the water or other great amount as opposed to a 10° during its normal service mode. As a result the brewer cycles through reheating about as one-third as frequently as in the normal mode. Such a reduction of recycling during the after hours mode is particularly important in extending life of the components, particularly the relay controlling the heating element since that relay has a expected life of about 200,000 cycles. Without the after hours mode, the typical life span of a relay would be six to eight years. But the reduction of cycling as a result of the after-hours mode, as in the invention, the lifetime of the components would be extended considerably and in many cases, it is estimated that the service life could be doubled as compared to the prior art. If the brew button is pushed during the after-hours mode, the brewer reverts back to normal operation allowing 10° F. drops before reheating.

The invention further incorporates certain safety features by which if the heating element is on for a predetermined period of time, for example four minutes continuously, and the temperature fails to change by ±2° or similar amount, the heating element will be turned off and an indicator will then indicate that the brewer must be reset. The foregoing safety feature may occur under a number of circumstances such as the brewer is at boiling and cannot get any hotter such as occurs in higher altitude areas, or the heating element could be defective. The microprocessor of the invention is also programmed to go to the reset mode if the temperature is sensed to be 214°. This condition can occur if the brewer has been energized without water in a tank. As a result of such monitoring of the brewing system, the invention obtains better quality coffee, elimination of double brews, extended component life, significant energy savings and safety protection involving the heater element itself.

DESCRIPTION OF THE PREFERRED EMBODIMENT

Figure 1:
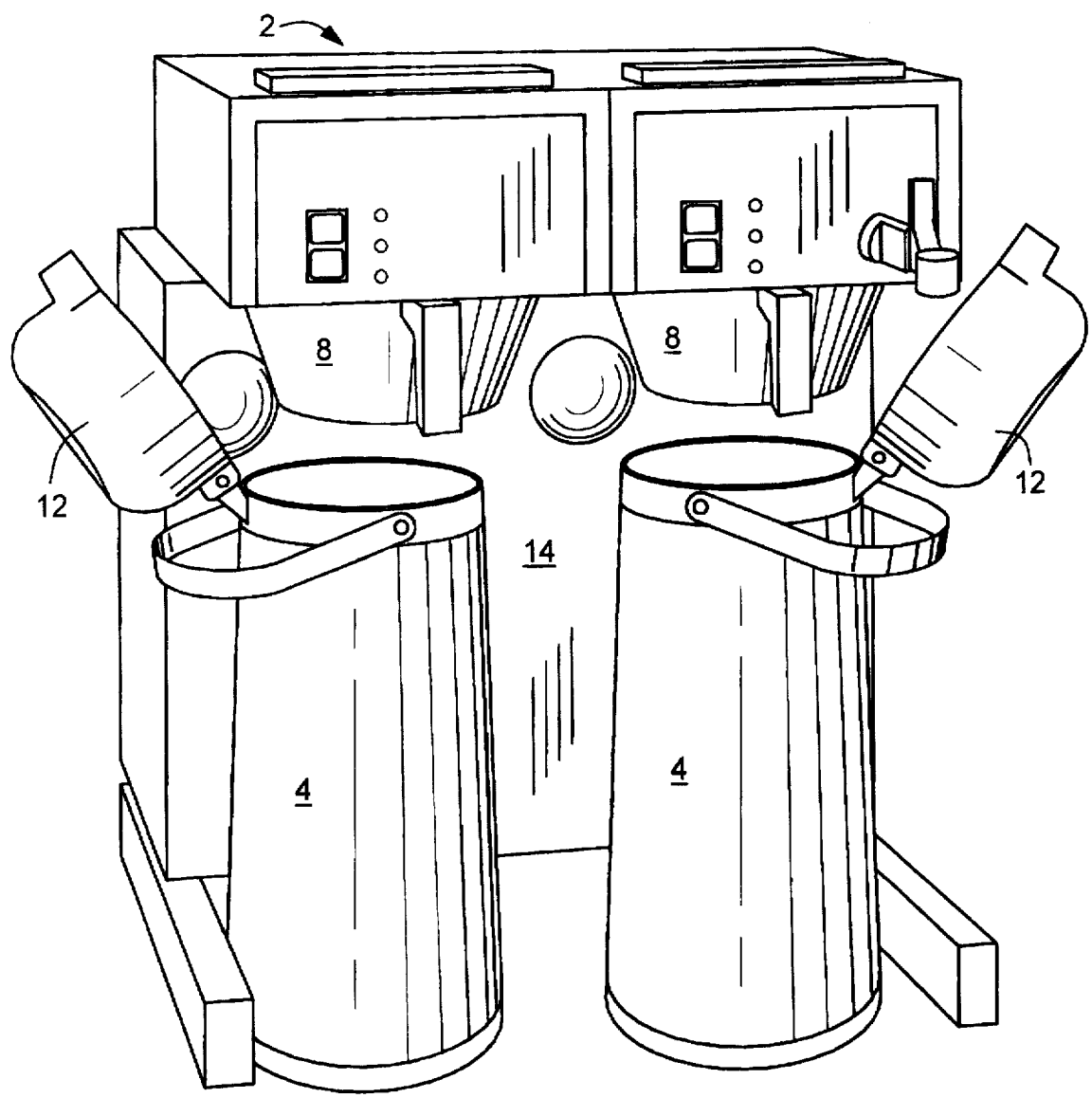
FIG. 1 is a front elevational view of a coffee brewing system employing the features of the invention.

Referring now to the drawings, there is illustrated a preferred embodiment of the electronic brew control system for a coffee brewer, generally designated by reference numeral 2. Although, the brewer system 2 of FIG. 1 is illustrated with respect to a dual brewing devices to selectively fill a pair of coffee decanters 4 with regular or decaffeinated coffee, it is within the scope of the invention to apply its teachings to coffee systems having a single brewing station or more than two stations as desired. As is well known, the housing of the brewer 2 includes a pair of water tanks (not shown) automatically connected to a source of water in which water is heated for a brewing operation. Each of the dual systems includes a removable coffee basket 8 in which a filter and coffee (not shown) is provided, through which the hot water is delivered in a conventional manner to cause water to pass through the selected basket and to flow through into the coffee decanters 4 positioned beneath the baskets. The coffee decanters 10 may be of a thermally insulated type and the like and from which coffee can be dispensed as needed. As seen in FIG. 1, each of the coffee decanters 4 includes an upper lid 12 to permit the filled coffee decanter 10 to be removed and the lid closed to maintain a desired temperature.

Figure 2:
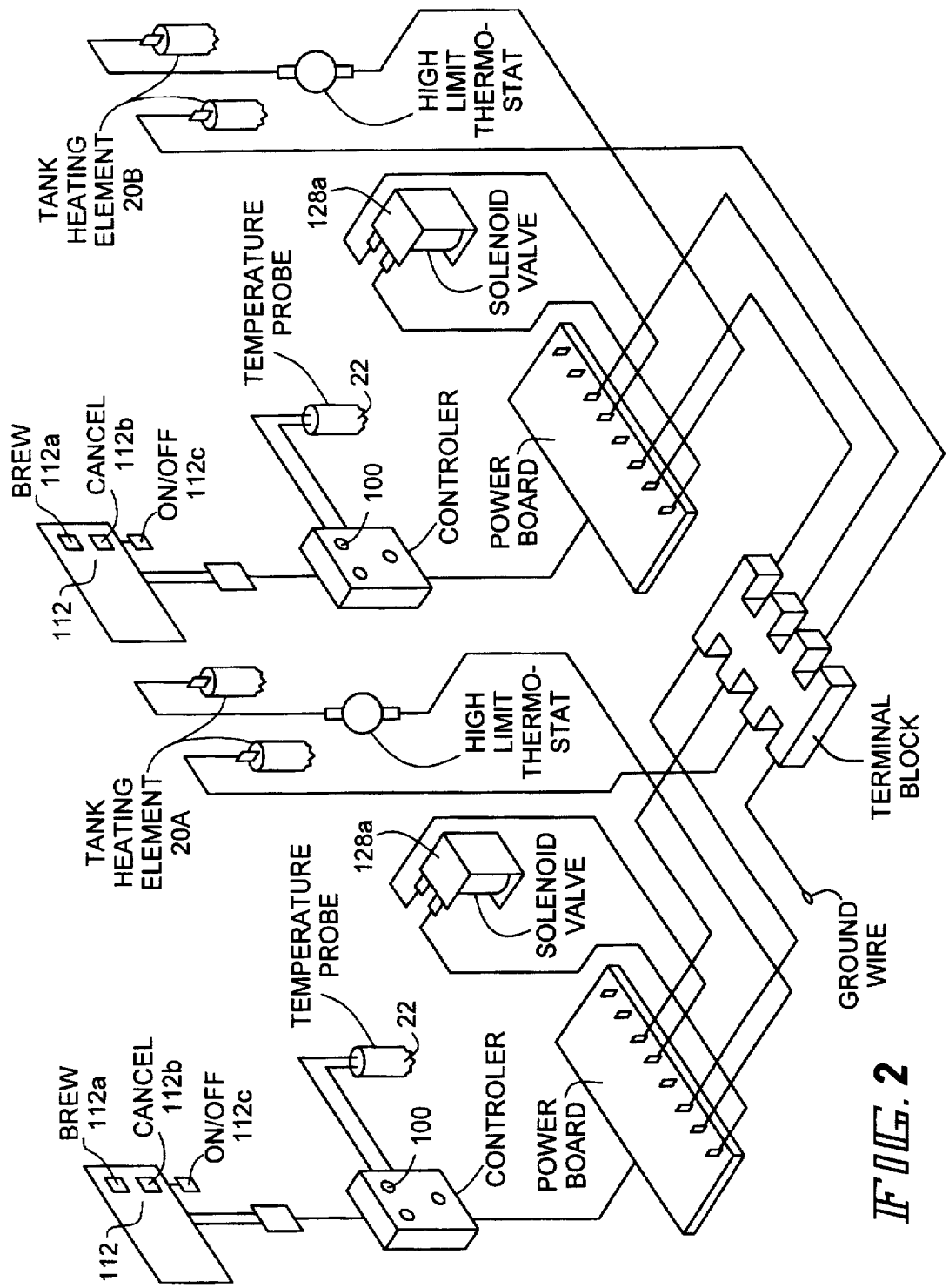
FIG. 2 is a schematic circuit diagram of the control circuit of the coffee brewer of FIG. 1.

As is conventional, the internal pair of water heater tanks (not shown) within housing 14 utilize electric heater elements 20 to heat the water in each tank (FIG. 2). Conventional temperature probes 22, such as a thermistor as its function will be described, are positioned within each respective water tank to sense the temperature of water. A pair of solenoid valves, as will be described, are connected to separate fluid conduits (not shown) coupled to the water tanks, such that when the solenoid valves are opened, water flows to the heater tanks and displaces hot water through the outlets above the coffee basket 8 as is conventional. The foregoing temperature probes and solenoid valves are controlled by the control circuit 50 of the invention in a manner to be described.

Figure 3:
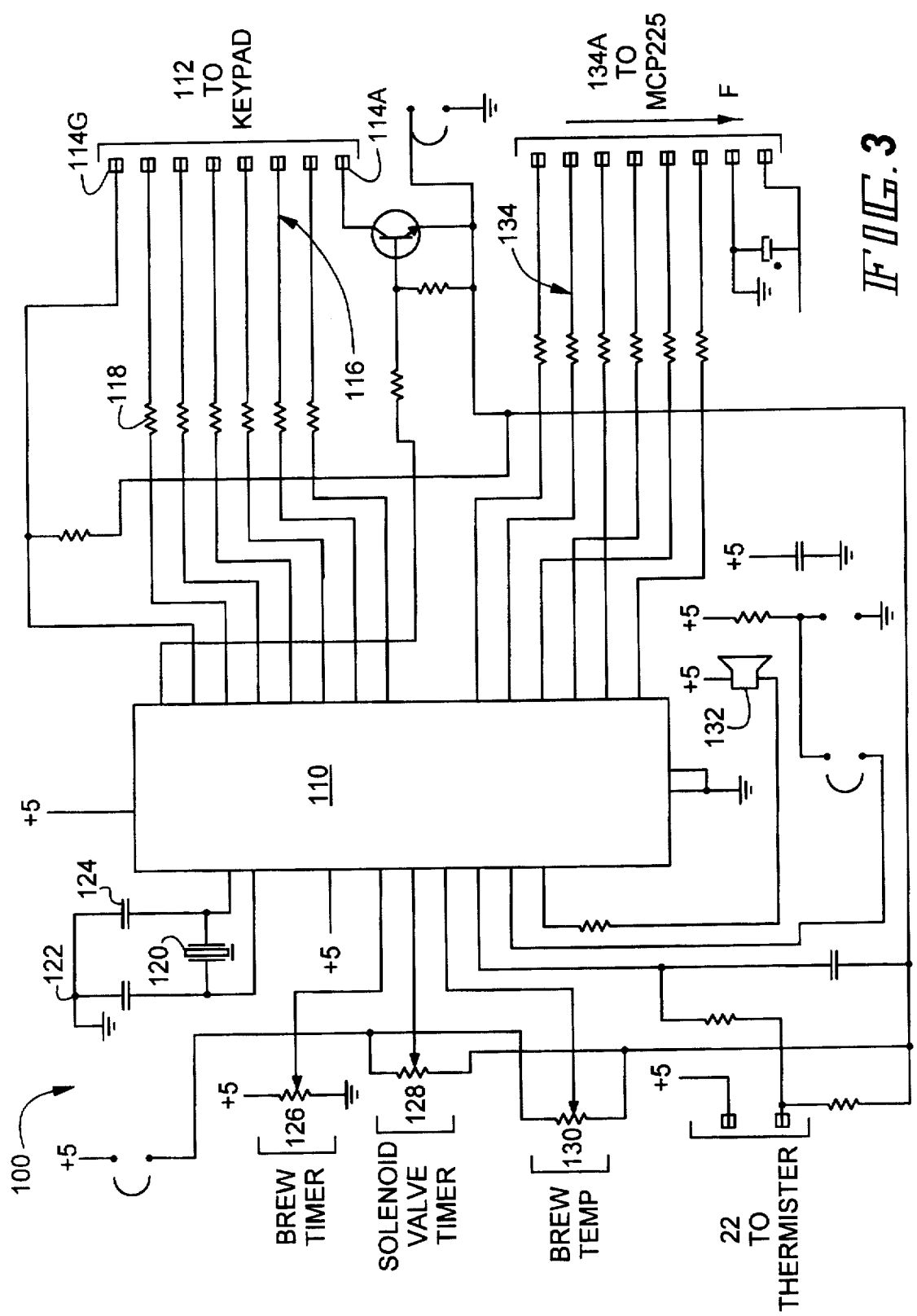
FIG. 3 is a schematic circuit diagram of the controller board of the control circuit of FIG. 2.
Figure 4:
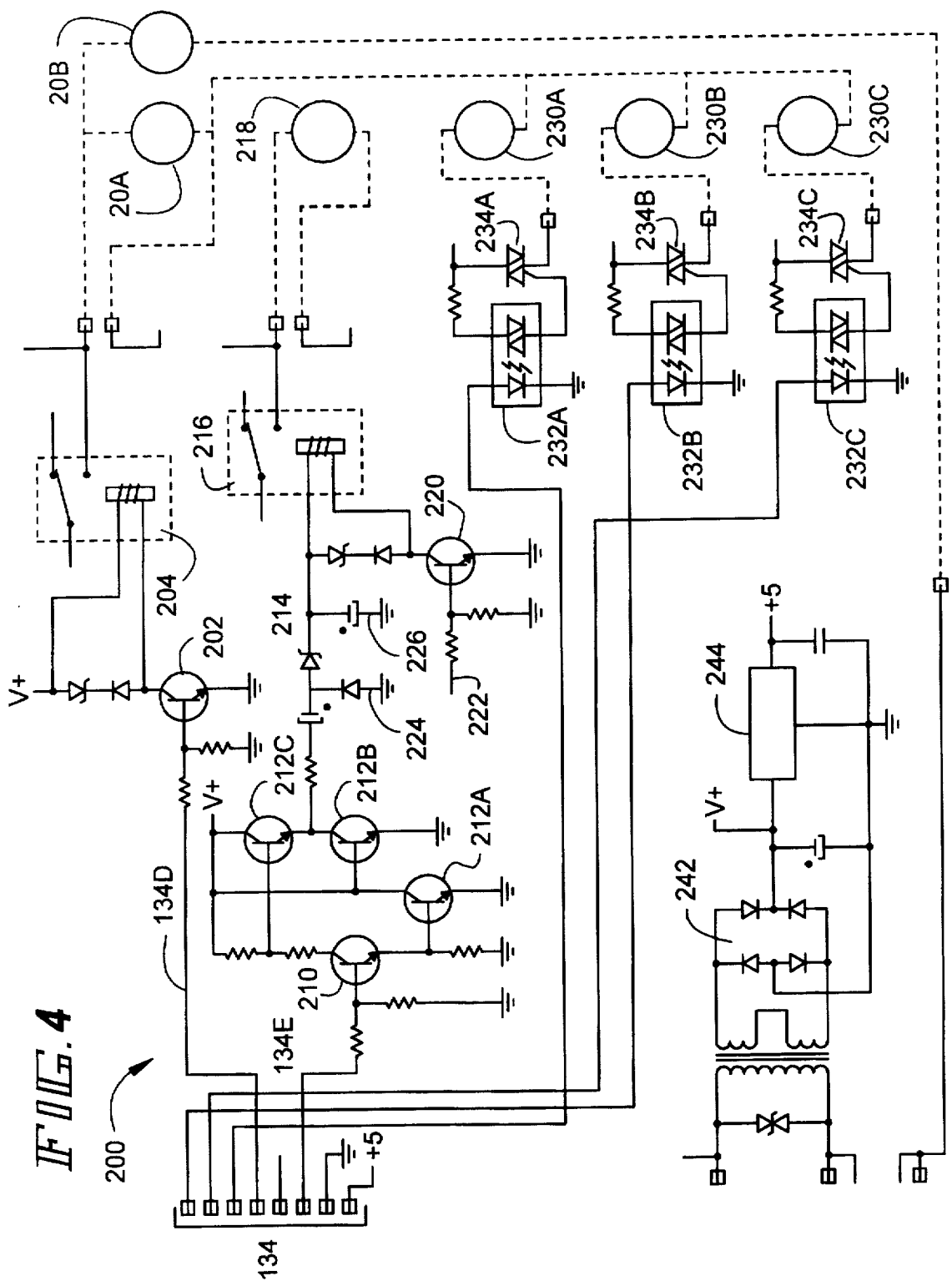
FIG. 4 is a schematic circuit diagram of the power board of the control circuit of FIG. 2.

The control circuit 50 is shown in detail in FIGS. 3 and 4. Referring now to FIG. 3, which shows a schematic of the control PC Board 100 of control circuit 50, information input to microcontroller 110, which in the preferred embodiment, is a PIC 16 C7 type from Microchip Technologies, Inc. Input to microcontroller 110 is achieved via keypad 112. Key pad 112 comprises a plurality of touch switches which are connected to terminals 114A through 114G. Contact 114H provides common for the light-emitting diodes associated with key pad 112 and contact 114G provides a common for the touch switches associated with key pad 112. The key pad 112 is shown as being on the front of the brewer 2 in FIG. 1. The key pad includes a manual brew actuator 112A, a cancel button 112B and an on/off button 112C.

Following back along leads 116 a plurality of resistors 118 serves to reduce the voltage incident on controller 110.

Program timing of controller 110 is provided by a quartz crystal clock 120 having a nominal frequency of 2.0 MHZ. Waveform distortions therefrom are transmitted to ground via parallel capacitors 122, 124.

Upon logical input to controller 110 via leads 116 from keypad 112 and dependent thereon, controller 110 queries at least one of a plurality of variable resistors, the first of which being operative to control the brew time and hence is identified as brew time potentiometer 126 wherein the brew potentiometer is operative to time the brewing cycle of the device. Solenoid valve timer 128 is operative to control first and second solenoid valves 128A, 128B which are operative to allow for the selective admission of water into the heater tank to displace hot water therefrom for brewing. Temperature potentiometer 130 is cooperative with temperature probe or thermistor 22 operatively positioned in each heater tank to provide control over the water temperature within the brewing unit 2 as driven by logic outputs from controller 110 as shall be subsequently described. The potentiometer 130 is externally adjustable to set water temperature for brewing at a selected temperature such as 200° F. or other level.

Controller 110 is further operative to actuate audio transducer 132 which is actuated by the controller logic upon actuation of key pad switch associated with either the brew or cancel button resident on keypad 112 as well as upon reception of a signal generated by the cooperation between clock 120 and brew timer potentiometer 126 corresponding to the completion of the brew cycle.

Controller 110 activates the various operations of the brewer unit 2 via output lead 134A through F which are operative to take voltage outputs corresponding to logical instructions from controller 110 to power board 200.

Referring now to FIG. 3 which shows a schematic of the line voltage or power board, output bus 134 from control board 100, transfers low voltage signals from controller 110 to line voltage control circuits resident on power board 200.

Heater control lead 134D serves as input to transistor 202 which operative to control heater relay 204 thereby selectively supplying power to heaters 20A and 20B which are operative to provide heated brewing water to the unit 2.

Upon an input from controller 110 to lead 134E, transistor 210 which is biased by transistor 212A provides a route to ground for transistor 212B which allows 212C to provide current to lead 214 thereby energizing relay 216 and actuating valve 218; however should valve 222 be in a state such that transistor 220 is closed, relay 216 is prevented from being actuated. Back current control being provided by diode 224 and the relay trigger spike being passed to ground via capacitor 226.

Leads 134A, 134B and 134C are operative to actuate plate heaters 230A, 230B and 230C via dedicated optoisolators 232A, 232B and 232C which serve to drive triac controllers 234A, 234B and 234C which are associated with plates 230A, 230B and 230C respectively.

Transistor power is supplied by a step down transformer 240 which supplies alternating current to rectifier bridge 242 which supplies direct current for operation of the transistors resident on power board 200 as well as to voltage regulator integrated circuit 244 which operative to provide conditioned power to controller board 100.

In operation a command signal is input from keypad 112 to controller 110 which actuates controller 110 to count cycles of clock 120 dependent on signal received from temperature sensor 131 as measured against brew temperature potentiometer 130. When signal from sensor 131 provides a voltage corresponding to a temperature at or above that which is registered as voltage across brew temperature potentiometer 130, controller 110 will send a signal to valve actuator lead 134F thereby commencing the brew cycle.

If signal from temperature sensor 22 corresponds to a lower temperature than is registered on temperature potentiometer 130, controller 110 will activate lead 134D so as to raise the water temperature to within desired parameters.

Should brew timer potentiometer, working in concert with clock 120, register that a brew cycle is in operation, controller 110 will disengage valve actuator lead 134F.

Should clock 120 register a sufficient passage of time without an input from keypad 112 corresponding in the preferred embodiment to a time of approximately three hours, controller 110 resets the range of input from thermistor 131 so as to allow for a larger temperature range of brewing water temperature before signaling heater 20A or 20B to bring the brewing water up to the set temperature provided by brew temperature potentiometer 130.

What is claimed is:

1. A beverage brewing system for heating water and delivering heated water to a product for brewing comprising
    water heater means for receiving a supply of water, and said water heater means including a heater element for heating the water,
    delivery means operatively coupled to the water heater means and arranged for delivering a selected volume of the heated water to the product during a selected brewer cycle,
    temperature detection means for sensing the temperature of the heated water,
    controller means operatively coupled to said water heater means for controlling operation of said heater element between a condition applying heat to the water and being in an off condition, said controller means being further in operative connection to said temperature detection means for controlling said heater element,
    said controller means being coupled to said delivery means for supplying water from said water heater heated to a predetermined temperature to said delivery means, and
    actuator means connected to said controller means to selectively cause said delivery means to deliver the volume of heated water at said predetermined temperature, said controller means preventing said delivery of heated water when said water is below said predetermined temperature.

2. The beverage brewing system according to claim 1 wherein said controller means causes said heater element to heat the supply of water when the temperature of the heated water deviates from the predetermined temperature.

3. The beverage brewing system according to claim 1 wherein said controller means causes said delivery means to deliver heated water for a selected duration for said preselected brewing cycle.

4. The beverage brewing system according to claim 1 wherein said delivery means includes a solenoid valve.

5. The beverage brewing system according to claim 3 further including timer means connected to said controller means, said timer means measuring said duration of the preselected brewing cycle.

6. The beverage brewing system according to claim 2 wherein said controller means prevents said delivery means from delivering an additional selected volume of heater water while said timer means is in process of measuring an earlier one of said preselected brewing cycles.

7. The beverage brewing system according to claim 1 wherein said controller means includes a programmable microprocessor.

8. The beverage brewing system according to claim 2 wherein said controller means increases said selected drop in temperature mode to a greater increment upon said actuator means failing to cause said delivery means to a volume of heated water for a predetermined period of time.

9. The beverage brewing system according to claim 8 wherein said selected drop in temperature is restored by said controller means after said actuator means activates said delivery means during said greater increment of temperature mode.

10. The beverage brewing system according to claim 9 wherein said selected drop is approximately 10° F.

11. The beverage brewing system according to claim 10 wherein said greater increment of temperature drop is approximately 25° F.

12. The beverage brewing system according to claim 1 wherein said controller means terminates operation of the heater element upon the failure of heated water being preset for delivery.

13. The beverage brewing system according to claim 1 wherein said failure of heated water being present is detected by temperature detection means sensing a selected elevated temperature level.

14. The beverage brewing system according to claim 1 wherein said controller means deactivates said heater element upon the temperature of the heated water failing to change by a predetermined amount after a continuous heating cycle duration.

15. The beverage brewing system according to claim 1 wherein said predetermined amount of temperature change is approximately ±2° F. and said heater cycle duration is approximately 4 minutes.

* * * * *

UNITED STATES PATENT AND TRADEMARK OFFICE
CERTIFICATE OF CORRECTION

PATENT NO. : 5,704,275
DATED : Jan. 6, 1998
INVENTOR(S) : Thomas I. Warne

It is certified that error appears in the above-identified patent and that said Letters Patent is hereby corrected as shown below:

IN THE CLAIMS:

Claim 12, line 3, delete "preset" and insert --present--

Claim 13, line 1 delete "1" and insert --12--

Signed and Sealed this

Twenty-first Day of April, 1998

*Attest:*

BRUCE LEHMAN

*Attesting Officer*   *Commissioner of Patents and Trademarks*